United States Patent [19]

Laing et al.

[11] Patent Number: 4,614,016
[45] Date of Patent: Sep. 30, 1986

[54] METHOD OF INSULATING PIPE WITH THERMO-LOCK INTERFIT INSULATION

[76] Inventors: Donald R. Laing, 32 Northview Rd., Unit #4, Nepean, Ontario, Canada, K2E 7E4; Michael R. Sweny, 70 West River Dr., Manotick, Ontario, Canada, K0A 2N0; John P. Giard, 32 Sherway Dr., Nepean, Ontario, Canada

[21] Appl. No.: 768,251

[22] Filed: Aug. 22, 1985

[51] Int. Cl.[4] .............................................. B23P 17/00
[52] U.S. Cl. ....................................... 29/412; 29/446; 29/455 R; 29/463; 138/149
[58] Field of Search ...................... 29/416, 412, 455 R, 29/463, 446, 526 R; 138/149

[56] References Cited

U.S. PATENT DOCUMENTS

| 312,037 | 2/1885 | Suhr | 138/149 |
|---|---|---|---|
| 1,558,364 | 10/1925 | Dverson | 29/463 UX |
| 2,324,181 | 7/1943 | Tulien | 138/149 X |
| 2,380,628 | 7/1945 | Zempel | 29/416 X |
| 2,650,180 | 8/1953 | Walker | 29/463 UX |
| 2,857,931 | 10/1958 | Lawton | 29/455 R UX |
| 3,137,919 | 6/1964 | Lakin | 29/416 X |
| 3,244,388 | 4/1966 | Coffman | 138/149 X |
| 4,298,554 | 11/1981 | Vogel et al. | 138/149 X |

FOREIGN PATENT DOCUMENTS

| 541724 | 6/1957 | Canada . | |
|---|---|---|---|
| 791963 | 3/1958 | United Kingdom | 138/149 |
| 878517 | 10/1961 | United Kingdom | 138/149 |
| 1589475 | 5/1981 | United Kingdom | 138/149 |

Primary Examiner—Charlie T. Moon
Attorney, Agent, or Firm—Robert L. Olson

[57] ABSTRACT

A method of efficiently using fiberboard (10) for insulating pipes (16) carrying high temperature fluids. Semicylindrical pieces (12) are cut out of the board, with the legs (14) of the cut pieces having a length approximately five percent longer than necessary. When these pieces are installed on a pipe, the additional material is compressed mainly near the ends of the legs (where the fibers are radial to the pipe). This selectively increases the density where required for efficient insulating purposes. In addition, a better sealing of the joints between adjacent legs is accomplished.

2 Claims, 9 Drawing Figures

METHOD OF INSULATING PIPE WITH THERMO-LOCK INTERFIT INSULATION

BACKGROUND OF THE INVENTION

In order to reduce heat losses, insulation is used on most pipes carrying high temperature fluids. Presently, one common type of insulation used in high temperature situations is a molded jacket, formed in cylindrical halves, consisting of a fibrous material such as mineral fibers. Although this forms an adequate thermal barrier, it is very expensive to make. The fibers are generally wound around a cylindrical mandrel, cured so that they are thermally set, and then cut into semicylindrical pieces which can be later reassembled on the pipe to be insulated.

If these semicylindrical members could be cut from mineral fibers in board or block form, they would be much cheaper to make. However, until the present invention, this has not been possible. Pipe insulation cut from block or board insulation results in physical differences from the molded product. The molded insulation, where the fibers are wound around the mandrel, has fibers whose axes are always perpendicular to the direction of heat flow from the pipe. This is the optimum orientation with regard to the prevention of heat transfer. The insulation cut from board insulation has fibers ranging from perpendicular to parallel with the heat flow from the pipe. This form of insulation is considerably cheaper to fabricate, but is less efficient in preventing heat transfer. Heat transfer in insulation takes three main forms; air conduction, fiber conduction, and radiation. Tests show that mineral fiberboard suffers a substantial nonlinear increase in heat loss in the high temperature range. This indicates radiation as the predominate cause of heat loss. Radiation heat transfer is most easily controlled by increasing material density. If a way were found to selectively increase the material density where required, radiant losses could be minimized and the fiberboard insulation would approach the thermal efficiency of the more expensive molded type.

SUMMARY OF THE INVENTION

This invention is directed to the method of efficiently using fiberboard for insulating pipes for carrying high temperature fluids. Semicylindrical pieces are cut out of the board with the legs of the cut pieces having a length five percent longer than necessary. When these segments or pieces are installed on a pipe, the additional material compressed mainly only in the radial fiber sections (due to the decreased material rigidity in this area). This selectively increases the density where required. By only increasing the density of the area which requires it, the low temperature conductivity is not greatly increased, thus minimizing the detrimental effect on low temperature performance. An added advantage of this method of insulating is better joint sealing. The residual compressive forces within the radial fiber sections maintained a tight joint even after "curing" or heat-setting of the insulation.

DESCRIPTION OF THE PREFERRED EMBODIMENT

Figure 1:
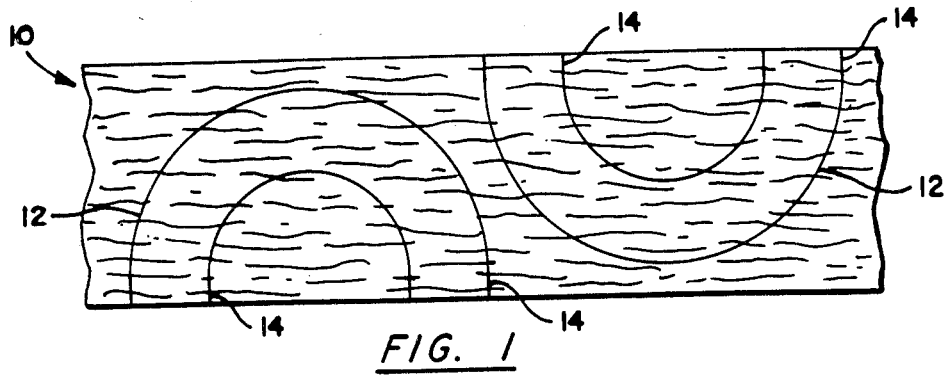
FIG. 1 is a sectional view of a fiberboard insulating material from which pieces in accordance with the invention can be cut.
Figure 1A:
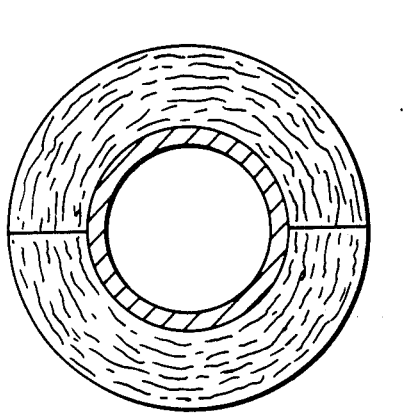
FIG. 1A shows molded pipe insulation as known in the prior art.

Looking now to FIG. 1, a fiber insulation board 10 from which semicylindrical piece for use in insulating pipes is shown. The fibers can be made of any well-known insulating material that can be spun or otherwise formed into fibers, such as rockwool, various silicas, or other minerals, and the invention applies to any fiberboard insulation. The fibers are generally compressed into board form in any well-known manner with a suitable binding material added. Substantially, semicylindrical pieces 12 are cut from the board or block with a saw. These pieces can be any suitable length, for example 3-10 feet. As can be seen, the vast majority of the fibers lie in parallel planes within the board. This differs from molded fiber insulation, where all of the fibers lie perpendicular to the heat flow from a pipe, as shown as FIG. 1A. The pieces are cut out such that the fibers near the ends of the legs 14 lie radially, or parallel to, the heat transfer flow when assembled on a pipe. The legs 14 of each piece 12 are cut so that they are approximately five percent longer than necessary.

Figure 2:
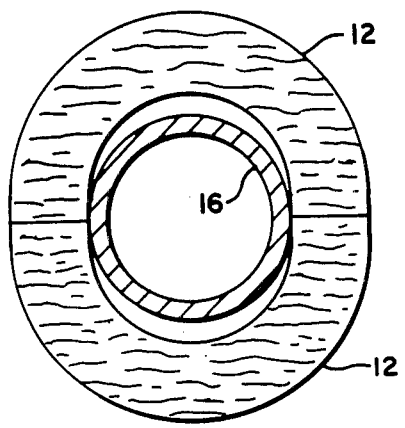
FIG. 2 is a sectional view of fiber insulation initially placed on a pipe.

Looking now to FIG. 2 the semicylindrical pieces 12 are shown initially placed on a pipe 16 to be insulated. This pipe 16 may carry any high temperature fluid, for example superheated steam.

Figure 3:
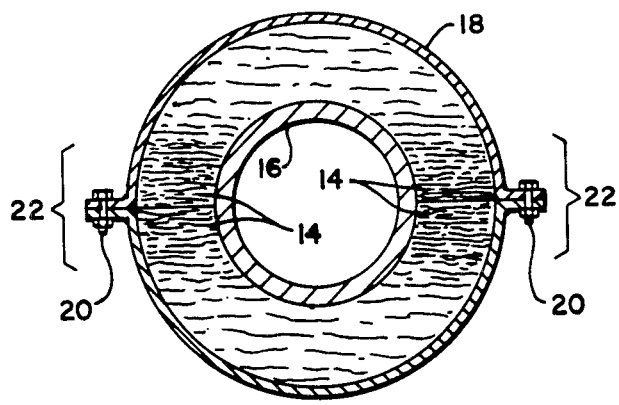
FIG. 3 is a view similar to FIG. 2 with aluminum lagging surrounding and compressing the fiberboard insulation.
Figure 6:
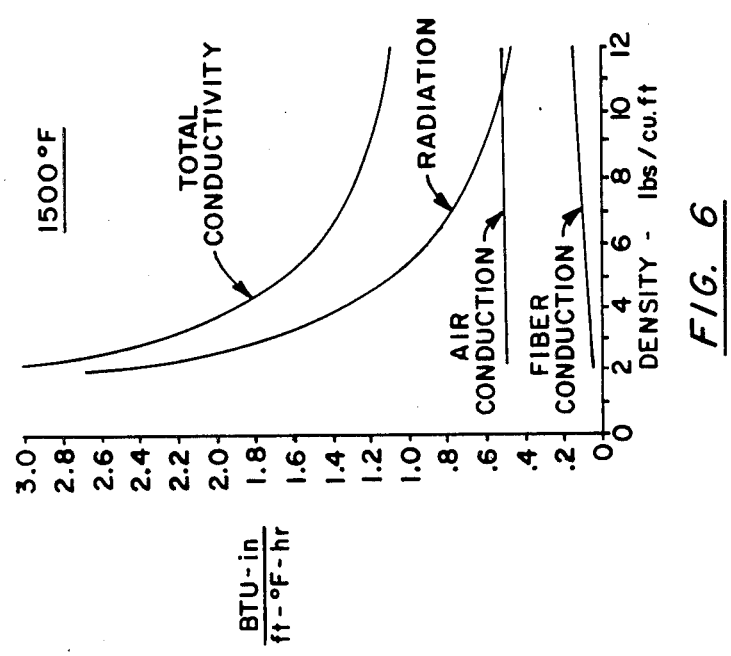
FIGS. 4-6 are graphs showing heat transfer rates through fiberboard insulation at various temperatures.
Figure 4:
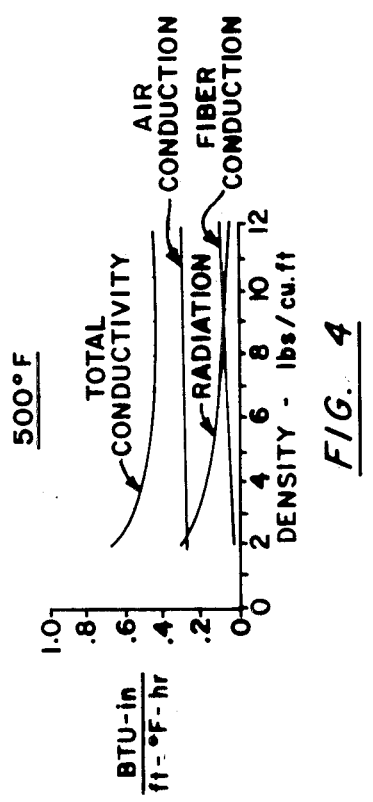
Figure 5:
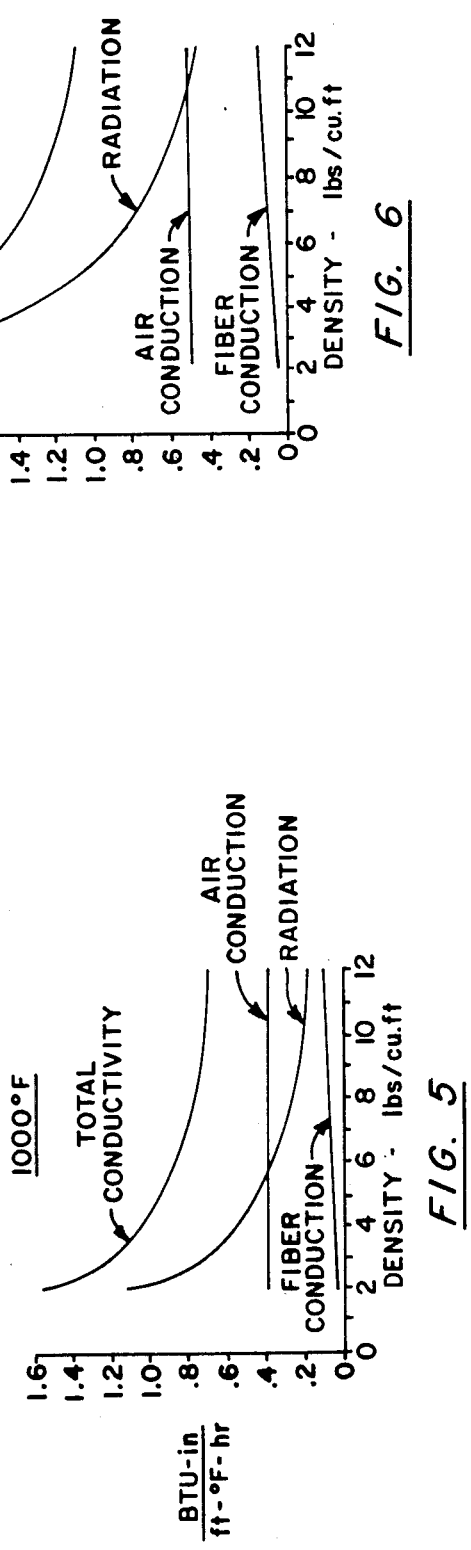

FIG. 3 shows semicylindrical lagging or jacketing members 18 placed over the insulating board and secured together in any well-known manner at 20, for example by nuts and bolts. This lagging 18 can be of any suitable material, for example a thin aluminum sheeting, and protects the insulation from being damaged while also holding and clamping the insulation in place. Because of the five percent overlength of legs 14, the insulation pieces 12 are compressed within the jacket 18. Most of the compression takes place in the area designated 22 in FIG. 3 near the outer extremities of the legs 14, where they abut together. This increased density in this area minimizes heat transfer by radiation at the higher temperatures. It also forms a tight seal or joint, where the legs 14 of the semicylindrical members butt up against one another. As can be seen, this is the area where the fibers lie radial to the pipe; or put another way, the fibers lie parallel with the path of heat flow from the pipe. Looking at the charts of FIGS. 4-7, it can be seen that the conductivity of the heat transfer rate increases considerably at the higher temperatures in low density materials.

Figure 7:
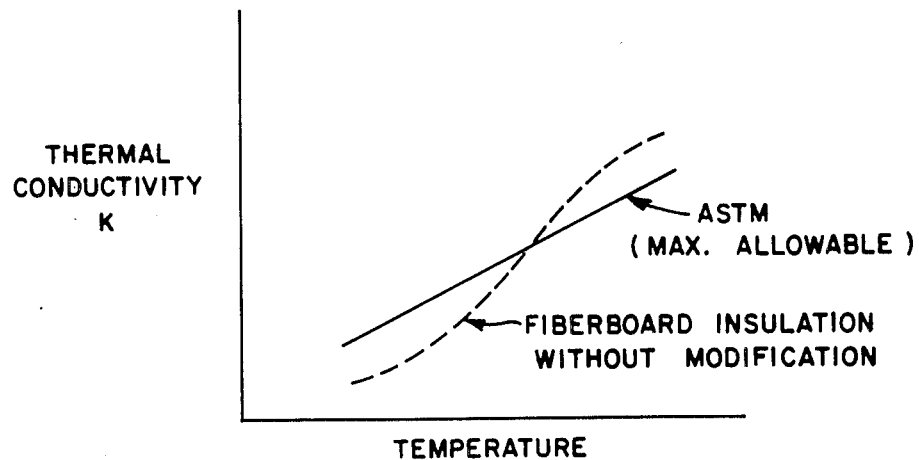
FIG. 7 is a graph showing thermal conductivity of pipe fiberboard insulation without the benefit of modification in accordance with the invention.
Figure 8:
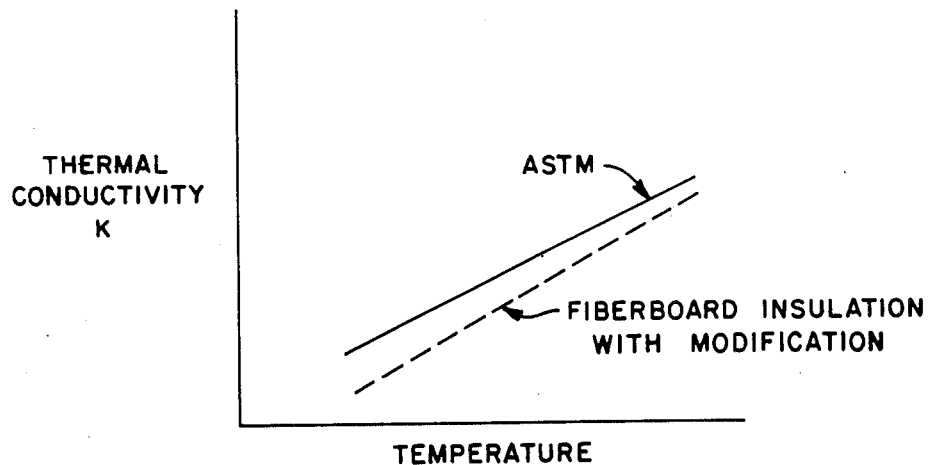
FIG. 8 is a graph showing thermal conductivity of pipe fiberboard insulation with the benefit of modification in accordance with the invention.

FIG. 7 shows the conductivity of a mineral fiberboard pipe insulating material without the modification of the invention, compared to that allowed by the ASTM code. As can be seen, at the higher temperatures, the maximum allowed by the code is exceeded. FIG. 8 shows the conductivity with the modification of the invention. As shown, the conductivity curve of the fiberboard pipe insulation stays beneath that allowed by the ASTM code even at the higher temperatures.

What is claimed is:

1. The method of insulating a pipe of a given outer diameter, including the steps of cutting a pair of substantially semicylindrical pieces out of a fiberboard insulating board, the pieces being cut such that each leg of each piece is approximately five percent longer than necessary, assembling the pieces on a pipe so as to cover the entire periphery of the pipe, and clamping the two pieces together so that the fibers in the two pieces are compressed.

2. The method set forth in claim 1, wherein the pieces are cut such that the fibers in the legs in each piece lie substantially parallel to radial lines of the pipe, while the fibers in the curved portion joining the legs of the piece lie substantially perpendicular to radial lines.

* * * * *